(12) United States Patent
Logemann et al.

(10) Patent No.: US 9,130,781 B2
(45) Date of Patent: *Sep. 8, 2015

(54) DATA SINK/DATA SOURCE, DATA TRANSMISSION DEVICE AND DATA TERMINAL DEVICE FOR A CIRCUIT-SWITCHED AND PACKET-SWITCHED NETWORK

(75) Inventors: Gunter Logemann, Unterhaching (DE); Hasan Palandöken, Gauting (DE); Frank Schäfer, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 408 days.

This patent is subject to a terminal disclaimer.

(21) Appl. No.: 12/713,898

(22) Filed: Feb. 26, 2010

(65) Prior Publication Data

US 2010/0157992 A1 Jun. 24, 2010

Related U.S. Application Data

(63) Continuation of application No. 10/514,226, filed as application No. PCT/EP2004/001934 on Feb. 26, 2004, now Pat. No. 7,715,364.

(30) Foreign Application Priority Data

Feb. 26, 2003 (DE) .................................. 103 08 304

(51) Int. Cl.
*H04L 12/66* (2006.01)
*H04M 11/00* (2006.01)
(Continued)

(52) U.S. Cl.
CPC ........ *H04L 12/6418* (2013.01); *H04L 12/5692* (2013.01); *H04M 7/0057* (2013.01); *H04L 2012/6472* (2013.01); *H04L 2012/6475* (2013.01); *H04M 2207/206* (2013.01)

(58) Field of Classification Search
CPC . H04L 2012/64; H04L 12/64; H04M 1/2535; H04M 1/2473; H04M 7/006
USPC ......................... 370/352–356, 401, 466, 467; 379/93.09, 100.15–100.17, 142.15, 379/142.13; 725/93, 94, 98–100, 106, 725/109–111; 455/557, 560–561
See application file for complete search history.

(56) References Cited

U.S. PATENT DOCUMENTS

| 4,596,021 A | 6/1986 | Carter et al. ....................... 375/5 |
| 4,802,203 A | 1/1989 | Muller et al. .................... 379/80 |

(Continued)

FOREIGN PATENT DOCUMENTS

| DE | 19645368 A1 | 4/1998 | ............. H04L 12/64 |
| EP | 0376543 A2 | 7/1990 | ............. H04Q 11/04 |

(Continued)

OTHER PUBLICATIONS

National Receipt of Grant Decision, Russian application No. 2009107500/09, 39 pages, Mar. 2, 2011.

(Continued)

*Primary Examiner* — Wutchung Chu
(74) *Attorney, Agent, or Firm* — Slayden Grubert Beard PLLC

(57) ABSTRACT

A data sink/data source data transmission device and data terminal device for a circuit-switched and packet-switched network that eliminates the logical separation between applications, which are based on the circuit-switched network (e.g., PSTN, ISDN), and applications, which are based on the packet-switched network, (e.g., Internet). To this end, a data transmission device for transmitting and receiving data into/from the circuit-switched network includes controllable switchover parts. This data transmission device is or can be assigned to a universally useable unit for automatically processing data and for transmitting and receiving data to/from the packet-switched network and is assigned or can be assigned to the at least one data terminal device for transmitting and receiving data into/from the circuit-switched network.

33 Claims, 4 Drawing Sheets

(51) Int. Cl.
*H04M 15/00* (2006.01)
*H04M 9/02* (2006.01)
*H04L 12/64* (2006.01)
*H04L 12/54* (2013.01)
*H04M 7/00* (2006.01)

(56) References Cited

U.S. PATENT DOCUMENTS

| | | | | |
|---|---|---|---|---|
| 4,996,685 | A | | 2/1991 | Farese et al. ............... 370/58.1 |
| 5,157,662 | A | * | 10/1992 | Tadamura et al. ............. 370/352 |
| 5,208,806 | A | * | 5/1993 | Hasegawa ..................... 370/352 |
| 5,347,516 | A | * | 9/1994 | Yoshida ....................... 370/401 |
| 5,598,411 | A | * | 1/1997 | Matsukawa ................... 370/352 |
| 5,610,910 | A | | 3/1997 | Focsaneanu et al. ........... 370/351 |
| 5,889,774 | A | * | 3/1999 | Mirashrafi et al. ............ 370/352 |
| 5,956,331 | A | * | 9/1999 | Rautiola et al. ............... 370/338 |
| 5,995,606 | A | | 11/1999 | Civanlar et al. ............... 379/201 |
| 6,026,086 | A | | 2/2000 | Lancelot et al. ............... 370/353 |
| 6,029,047 | A | * | 2/2000 | Ishida et al. .................. 725/106 |
| 6,118,857 | A | * | 9/2000 | Terschluse .................. 379/93.35 |
| 6,137,792 | A | | 10/2000 | Jonas et al. .................... 370/354 |
| 6,222,829 | B1 | * | 4/2001 | Karlsson et al. ............... 370/329 |
| 6,452,922 | B1 | * | 9/2002 | Ho ................................ 370/352 |
| 6,590,869 | B1 | | 7/2003 | Beyda et al. .................. 370/248 |
| 6,671,272 | B2 | | 12/2003 | Vaziri et al. ................... 370/352 |
| 6,700,956 | B2 | * | 3/2004 | Chang et al. ................ 379/93.09 |
| 6,781,983 | B1 | * | 8/2004 | Armistead .................... 370/353 |
| 6,850,986 | B1 | | 2/2005 | Peacock ........................ 709/232 |
| 6,882,640 | B1 | * | 4/2005 | Berger et al. .................. 370/353 |
| 6,954,453 | B1 | | 10/2005 | Schindler et al. .............. 370/352 |
| 6,980,643 | B2 | * | 12/2005 | Chen et al. .................... 379/377 |
| 7,170,980 | B2 | * | 1/2007 | Lim .............................. 379/93.07 |
| 7,369,545 | B1 | * | 5/2008 | West et al. .................... 370/354 |
| 7,474,746 | B2 | * | 1/2009 | Berkowitz et al. ............. 379/225 |
| 7,715,364 | B2 | | 5/2010 | Logemann et al. ............ 370/352 |
| 7,990,984 | B2 | * | 8/2011 | Carew et al. .................. 370/401 |
| 8,032,137 | B1 | * | 10/2011 | Virtanen ........................ 455/433 |
| 8,175,083 | B2 | * | 5/2012 | Schindler et al. .............. 370/352 |
| 2001/0022784 | A1 | * | 9/2001 | Menon et al. .................. 370/352 |
| 2002/0027876 | A1 | * | 3/2002 | Barzegar et al. .............. 370/216 |
| 2002/0085520 | A1 | * | 7/2002 | Sydon et al. ................... 370/335 |
| 2002/0089975 | A1 | | 7/2002 | Vaziri et al. ................... 370/352 |
| 2002/0122401 | A1 | * | 9/2002 | Xiang et al. ................... 370/338 |
| 2002/0122417 | A1 | * | 9/2002 | Miller et al. ................... 370/352 |
| 2002/0164003 | A1 | * | 11/2002 | Chang et al. ................ 379/93.05 |
| 2003/0039237 | A1 | * | 2/2003 | Forslow ........................ 370/352 |
| 2003/0093808 | A1 | * | 5/2003 | Eyer et al. ..................... 725/111 |
| 2003/0174685 | A1 | * | 9/2003 | Hasebe ......................... 370/338 |
| 2004/0032857 | A1 | * | 2/2004 | Tannan ......................... 370/351 |
| 2004/0192292 | A1 | * | 9/2004 | Chang et al. ................ 455/426.1 |
| 2004/0210892 | A1 | | 10/2004 | Sharma ......................... 717/168 |
| 2005/0073995 | A1 | * | 4/2005 | Yeh et al. ...................... 370/352 |
| 2005/0243851 | A1 | * | 11/2005 | Schindler et al. .............. 370/416 |
| 2006/0002381 | A1 | * | 1/2006 | Socaciu ......................... 370/352 |
| 2006/0013195 | A1 | * | 1/2006 | Son et al. ...................... 370/352 |
| 2006/0023696 | A1 | * | 2/2006 | Berger et al. .................. 370/352 |
| 2006/0129643 | A1 | | 6/2006 | Nielson et al. ................ 709/206 |

FOREIGN PATENT DOCUMENTS

| | | | |
|---|---|---|---|
| EP | 1071246 A2 | 1/2001 | ............ H04L 12/64 |
| EP | 1191753 A2 | 3/2002 | ............ H04L 12/64 |
| RU | 98101325 A | 12/1999 | ............ G06F 15/16 |
| RU | 2195080 C2 | 12/2002 | ............ H04L 12/64 |
| WO | 98/15933 | 4/1998 | ............ G08G 1/01 |
| WO | 02/41583 A2 | 5/2002 | ............ H04L 12/28 |

OTHER PUBLICATIONS

Russian Office Action, Application No. 2011119803/07, 90 pages, Dec. 10, 2012.

* cited by examiner

DATA SINK/DATA SOURCE, DATA TRANSMISSION DEVICE AND DATA TERMINAL DEVICE FOR A CIRCUIT-SWITCHED AND PACKET-SWITCHED NETWORK

CROSS-REFERENCE TO RELATED APPLICATIONS

This application is a continuation of U.S. patent application Ser. No. 10/514,226 filed Nov. 12, 2004 now U.S. Pat. No. 7,715,364, which is a U.S. National Stage Application of International Application No. PCT/EP2004/001934 filed Feb. 26, 2004, which designates the United States of America, and claims priority to DE Application No. 10308304 filed Feb. 26, 2003, the contents of which are hereby incorporated by reference in their entirety.

BACKGROUND OF THE INVENTION

Publications on the subject of "Home Networking" or the "Connected Home" or "Telephony and Control" talk about the networking of devices in the private field, such as, for example, TVs, personal computers and other devices in everyday life. In this connection, the telephone, fixed network telephone or cordless telephone, serves as the gateway to the circuit-switched network (voice network). Here, access to the packet-switched network (data network)—(e.g., Internet access) is insignificant, and can be effected in various ways.

The connection between the packet-switched and circuit-switched network, as shown in FIG. 1, only exists to the extent that devices, such as a personal computer which is connected to the packet-switched network, (e.g., the Internet), via an Ethernet, Digital Subscriber Line (DSL) or cable link, for the purpose of transmitting data in packets and, for example, a cordless base station which is connected to the circuit-switched network via an ISDN/PSTN network termination for the purpose of speech transmission, request that a connection be established (control), or to configure the device with the help of a cordless mobile module (configuration). In doing this, parts of the cordless base station or the telephone functionality are transferred to the personal computer. The control and configuration also can, of course, be effected in the opposite direction.

What is critical, however, is that no voice data is processed in the packet-switched network or data network, as applicable, but instead there is always a logical link between the voice terminal device, the cordless mobile module, and the switching center, the cordless base station. That is, there is no logical link between the circuit-switched voice network and the packet-switched data network (e.g., the Internet) in relation to voice data. The benefits of voice services in the packet-switched data network (such as, for example, Internet telephony, voice messages) are currently not utilized via a cordless mobile module registered with the cordless base station.

Accordingly, the present invention a data sink/data source, data transmission device and data terminal device for a circuit-switched and packet-switched network which eliminates the logical separation between applications which are based on a circuit-switched network, (e.g., PSTN, ISDN), and applications based on a packet-switched network, (e.g., the Internet).

SUMMARY OF THE INVENTION

The idea underlying the present invention is that a data transmission device for the sending and receiving of data, in particular voice and/or packet data, respectively into the circuit-switched network or out of the circuit-switched network, which is assigned to or can be assigned to a universally usable device for the automatic processing of data and for the sending and receiving of data respectively into the packet-switched network or out of the packet-switched network, and to which is assigned or can be assigned at least one data terminal device for the sending and receiving of data, in particular voice and/or packet data, respectively into the circuit-switched network or out of the circuit-switched network, is provided with a controllable switching facility which can be controlled in such a way that the data terminal device, which in a first operating mode is connected via the data transmission device to the circuit-switched network, can be switched over from the first operating mode to a second operating mode, in which the data terminal device is on one side connected via the data transmission device and the data processing device to the packet-switched network, and vice versa, that a change of operating mode occurs.

The present invention consists in the enhancement of a data transmission device which is, for example, constructed as a cordless base station, by the addition of a switchover capability, which is achieved in accordance with one embodiment preferably by software stored in non-transitory media and executable by respective processing hardware, so that the voice data streams can be forwarded to a data processing device, which in accordance with claim 24 preferably takes the form of a personal computer, notebook or server for the home and/or the office, and thus makes possible new applications. With a data transmission device devised in this way or with the cordless base station, as applicable, there is then a possibility of forwarding voice and/or signaling data streams to a data processing device, such as a personal computer, which is networked with the Internet. In this way, voice applications which are based on the Internet or a personal computer (such as, for example, Internet telephony, "voice messaging," etc.) can be used by data terminal devices operated at the data transmission device.

As such, data terminal devices, (e.g., a cordless mobile module or a telephone), can switch a logical connection for voice data into the packet-switched network, (e.g., into the Internet or a local data network in the "home networking" scenario).

The main effect of this is to increase user-friendliness. The invention present enables applications, which at present are possible using a headset operated from a personal computer, also to be carried out also on a cordless mobile module.

The switchover capability in the cordless base station, in accordance with the present invention, allows the user the option of setting two operating modes on the cordless mobile module.

In a first operating mode, the cordless mobile module works like a normal telephone on the circuit-switched network.

In a second operating mode, the voice and protocol data are fed to the data processing device (e.g., a personal computer), or to the data network. In this case, there is no connection to the circuit-switched network. In addition, data about the user inputs to the cordless mobile module are forwarded to the personal computer, and display data is sent to the cordless mobile module by the personal computer. In addition, the voice channels are connected transparently to the personal computer, via a so-called tunnel connection.

This enables the cordless mobile module which is connected to the cordless base station to use an application which is running on the personal computer such as, for example, a headset. Additional applications can be activated by interactions with the user via display and control data, whereby the user friendliness, in particular, is further increased. In this way, for example, "Voice over Internet Protocol" telephony (VoIP telephony) becomes possible using a conventional cordless telephone (making the functionality of telephony available to all the applications in a network (e.g., a personal computer in a home network)). In addition, it is possible for the conventional cordless telephone to be used, for example, to perform online games, realize voice control functions in the home network, and operate devices in the home network remotely.

Using the present invention it is also possible, for example, to integrate conventional cordless telephones into a "connected home" scenario. In this situation, the personal computer serves as a "VoIP gateway" for "VoIP telephony." Integration into games consoles, such as the X-Box, is also possible.

Further, the present invention offers the possibility of controlling applications on the data processing device via the data terminal device, on the basis of voice control and voice recognition mechanisms, of using the data terminal device as a remote control unit, of establishing access to Microsoft's Messenger Service via the data terminal device, of realizing an Internet radio, or Internet chatting using the cordless mobile module or a telephone, of converting text messages into voice messages ("Text to Speech") so that, for example, e-mails can be read out, and/or of showing messages on the data terminal device's display.

However, the present invention may be used not only in the home situation as explained above, when the data transmission device takes the form of a cordless base station, the data terminal device a cordless mobile module and the data processing device a personal computer, but also may be used exactly the same in public fields if the data transmission device takes the form of a cellular mobile radio communication infrastructure, consisting of a base station and central switching equipment, the data terminal device takes the form of a mobile telephone, and the data processing device a server.

Additional features and advantages of the present invention are described in, and will be apparent from, the following Detailed Description of the Invention and the Figures.

DETAILED DESCRIPTION OF THE INVENTION

Figure 1:
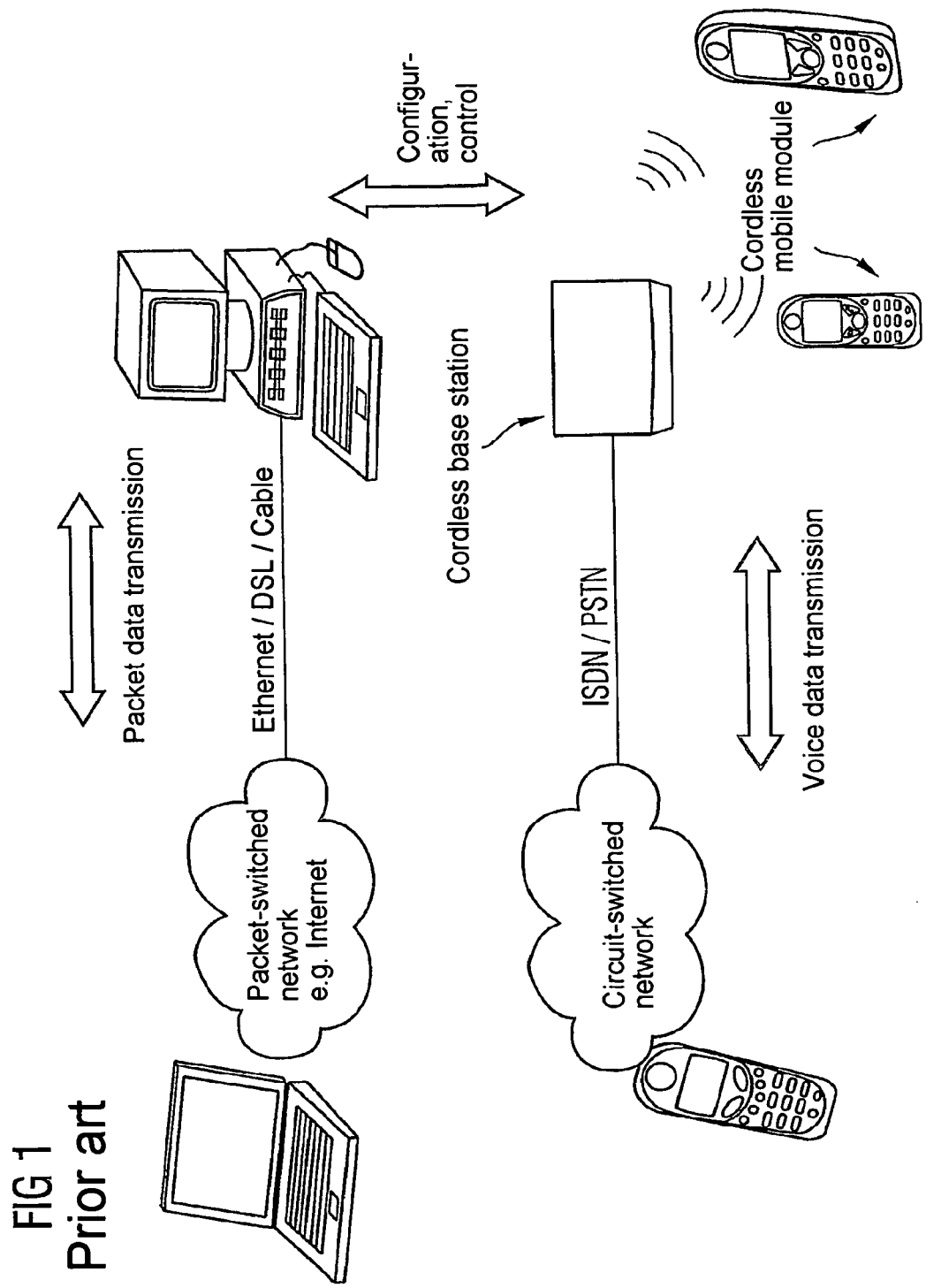
FIG. 1 shows a connection between a packet-switched and circuit-switched network as is known in the prior art.
Figure 2:
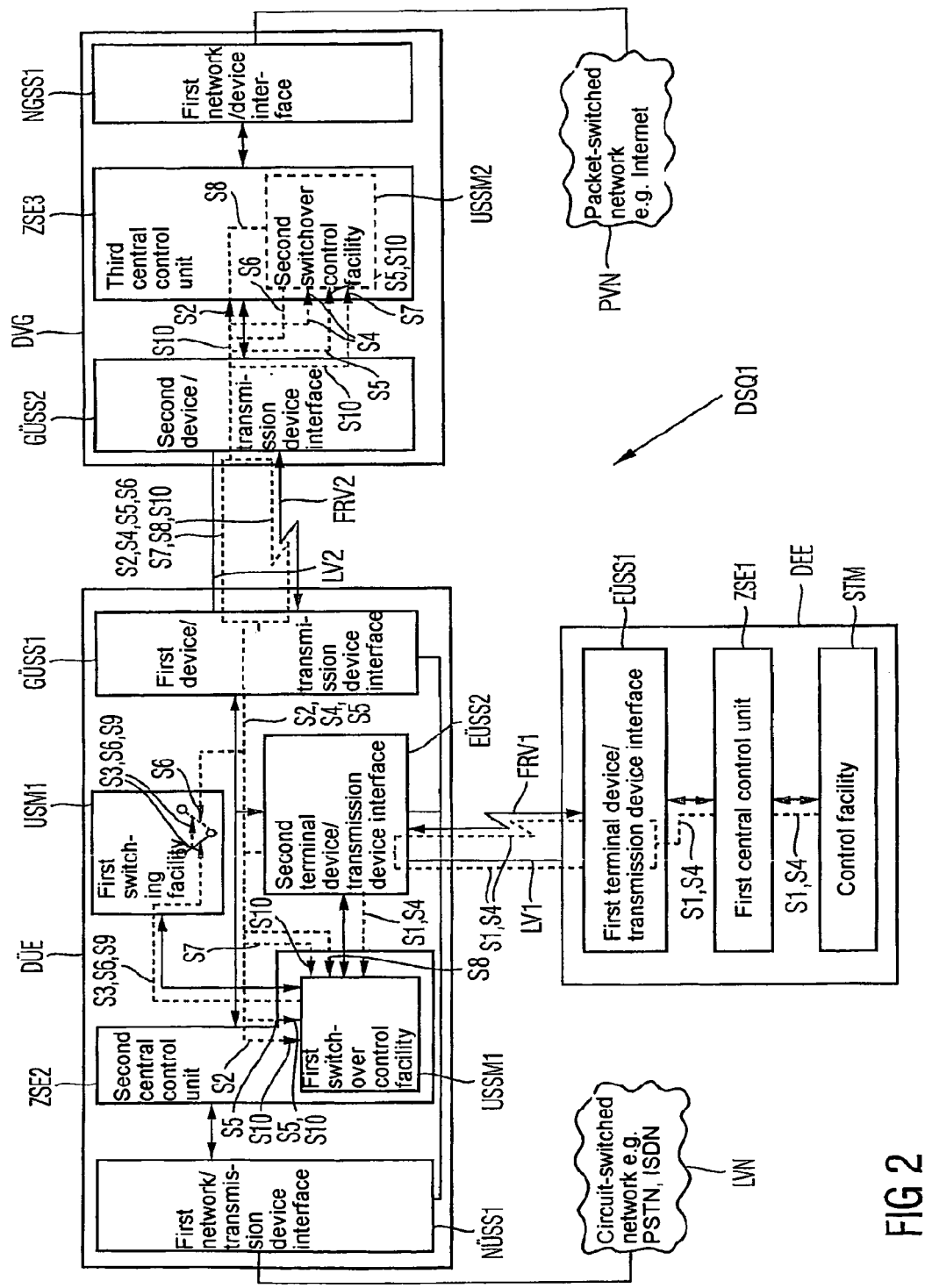
FIG. 2 shows a first data sink/source for a circuit-switched and packet-switched network, consisting of a data terminal device, a data transmission device and a data processing device.

FIG. 2 shows a first data sink/source DSQ1 for a circuit-switched network LVN, preferably in the form of a "Public Switched Telephone Network (PSTN)" or an "Integrated Services Digital Network (ISDN)," and a packet-switched network PVN, preferably in the form of the Internet, consisting of a data terminal device DEE, a data transmission device DÜE and a data processing device DVG.

The data terminal device DEE contains a first central control unit ZSE1, a control facility STM and a first terminal device/transmission device interface EÜSS1. The first central control unit ZSE1 is used to control the functional flows in the data terminal device DEE, and is connected both to the control facility STM and also to the first terminal device/transmission device interface EÜSS1. The data terminal device DEE is connected via the first terminal device/transmission device interface EÜSS1 to the data transmission device DÜE, which has a second terminal device/transmission device interface EÜSS2 for this connection. Either a first line link LV1 or a first air link FRV1 is provided as the link between the data terminal device DEE and the data transmission device DÜE.

Apart from the second terminal device/transmission device interface EÜSS2, the data transmission device DÜE also contains a second central control unit ZSE2, a first network/transmission device interface NÜSS1, a first switching facility USM1 and a first device/transmission device interface GÜSS1. The second central control unit ZSE2, which is used to control the functional flows in the data transmission device DÜE and has a first switchover control facility USSM1, is connected to the second terminal device/transmission device interface EÜSS2, the first network/transmission device interface NÜSS1, and the first device/transmission device interface GÜSS1. Together with the first switching facility USM1, the first switchover control facility USSM1 for the second central control unit ZSE2 forms one functional unit such that the switchover control facility USSM1 controls the switching facility USM1, which is represented in FIG. 2 by the link between the two facilities. The data transmission device DÜE is connected, on the one hand, via the first network/transmission device interface NÜSS1 to the circuit-switched network LVN and, on the other hand, via the first device/transmission device interface GÜSS1 to the data processing device DVG, which for this connection has a second device/transmission device interface GÜSS2. For the link between the data transmission device DÜE and the data processing device DVG, either a second line link LV2 is once again provided or a second air link FRV2.

In addition to the second device/transmission device interface GÜSS2, the data processing device DVG contains yet a third central control unit ZSE3 and a first network/device interface NGSS1. The third central control unit ZSE3, which is used to control the functional flows in the data processing device DVG, and optionally has a second switchover control facility USSM2, shown dashed in FIG. 2, additional to the first switchover control facility USSM1 of the second central control unit ZSE2 in the data transmission device DÜE, is connected to the second device/transmission device interface GÜSS2 and the first network/device interface NGSS1. The data processing device DVG is connected to the packet-switched network PVN via the first network/device interface NGSS1.

Below, using as a basis the explanation of the construction of the first data sink/source DSQ1, the way that the data sink/source DSQ1 functions is explained in respect of the elimination of the logical separation between the first applications, which are based on the circuit-switched network LVN, and the second applications, based on the packet-switched network PVN.

From the point of view of the data terminal device DEE, which has until now, for example, been connected to the circuit-switched network LVN via the first line link LV1 or the first air link FRV1 and the data transmission device DÜE (cf., cordless base station as a data transmission device and cordless mobile telephone as a data terminal device in FIG.

1), this means that the user of the data terminal device DEE can take advantage as desired of services on the circuit-switched network LVN, on the one hand, and of services on the packet-switched network PVN, on the other hand, in each case as the addressee and the sender. In other words, the transmission path from the data terminal device DEE to the circuit-switched network LVN and to the packet-switched network PVN must, in each case, be available to the user as required, that is it can be swapped by the user on demand (change of operating mode of the data terminal device). Thus, in a first operating mode, the data terminal device DEE is, for example, connected to the circuit-switched network LVN via the data transmission device DÜE, and in a second operating mode is connected to the packet-switched network PVN via the data transmission device DÜE and the data processing device DVG.

Because of the link, which already exists for the specified familiar scenario (data terminal device ⇆ circuit-switched network), between the data terminal device DEE and the data transmission device DÜE, the first switching facility USM1 and the first switchover control facility USSM1 are present in the data transmission device DÜE for this purpose, together possibly with the second switchover control facility USSM2 in the data processing device DVG and the control facility STM in the data terminal device DEE. Apart from the control facility STM in the data terminal device DEE, which preferably takes the form of a keyboard, all of the facilities mentioned preferably take the form of program modules (software). In place of the keyboard, however, it is also possible to use voice control.

However, for each other conceivable scenario, the distribution of the facilities mentioned still could be different. This would be, for example, in the case of a scenario (data terminal device ⇆ packet-switched network) in which the data terminal device is, for example, connected to the packet-switched network via a line link or an air link and the data processing device. In this case, the switching facility and the switchover control facility preferably will be in the data processing device, while possibly there may be an additional switchover control facilities in the data transmission device.

Alternatively, it is also possible to have configuration in which the data transmission device is connected to the packet-switched device and the data processing device to the circuit-switched network.

For the scenario on which FIG. 2 is based (data terminal device ⇆ circuit-switched network), in which the first switching facility USM1 is in the data transmission device DÜE, then depending on whether (i) only the first switchover control facility USSM1 in the data transmission device DÜE, (ii) the first switchover control facility USSM1 in the data transmission device DÜE and also the second switchover control facility USSM2 in the data processing device DVG, whereby both switchover control facilities USSM1, USSM2, control the first switching facility USM1 in the data transmission device DÜE, (iii) both the first switchover control facility USSM1 in the data transmission device DÜE and also the second switchover control facility USSM2 in the data processing device DVG, whereby however, unlike case (ii), only the first switchover control facility USSM1 controls the first switching facility USM1 in the data transmission device DÜE, there are three embodiments of how the change of operating mode mentioned can be the achieved in the first data sink/source DSQ1.

Embodiment (i)

To describe this embodiment, it is now assumed that the data terminal device DEE is in the first operating mode, for example, in which the data terminal device DEE is linked to the circuit-switched network LVN via the data transmission device DÜE. Of course, the other case in which the data terminal device DEE is in the second operating mode, is also possible.

Suppose the user of the data terminal device DEE now wishes to swap into the second operating mode. The user of the data terminal device DEE initiates the operating mode change concerned by activating the control facility STM. Then, a first signal S1, to signal the change of operating mode, is transmitted from the data terminal device DEE via the first central control unit ZSE1 and the first terminal device/transmission device interface EÜSS1, under the control of the former, via the first line link LV1 or the first air link FRV1, as applicable, to the second terminal device/transmission device interface EÜSS2 in the data transmission device DÜE, which forwards the first signal S1 transmitted by the data terminal device DEE to the first switchover control facility USSM1.

The first switchover control facility USSM1 then generates a second signal S2 which it transmits to the data processing device DVG and, in turn to the third central control unit ZSE3, by which the data processing device DVG is informed that the data terminal device DEE wishes to establish a connection to the packet-switched network PVN via the data processing device DVG. After the data processing device DVG has been informed, the first switchover control facility USSM1 generates a third signal S3 and transmits this to the first switching facility USM1. By the transmission of this third signal S3, the first switching facility USM1 is instructed to close the transmission path to the circuit-switched network LVN, which the data terminal device DEE has until now, been using, and in its place to set up a new transmission path via the data processing device DVG to the packet-switched network PVN. In FIG. 2, this operation is indicated in the first switching facility USM1 by the switch symbol. The data terminal device DEE is thereby connected to the packet-switched network PVN, via the second line link LV2 or the second air link FRV2, as applicable, and the data processing device DVG. This transmission path, which belongs to the second operating mode, will now remain connected or set up, as applicable, until the user initiates a new operating mode change, in the same manner, this time a change from the second operating mode to the first operating mode.

Figure 4:
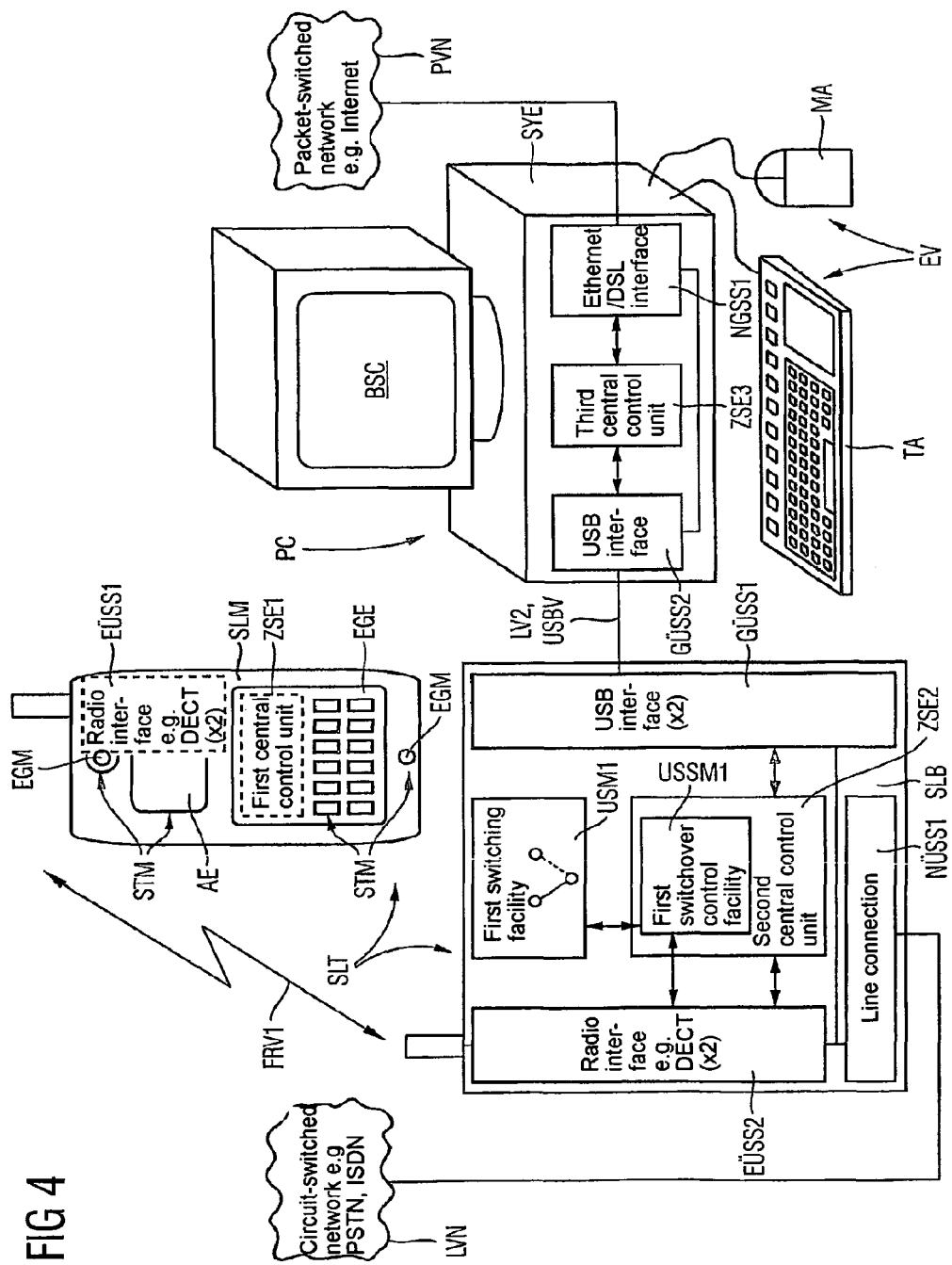
FIG. 4 shows an implementation of the first data sink/source using a cordless telephone and a personal computer.

In order to inform the user of the data terminal device about which operating mode the data terminal device is currently in, the operating mode which is active preferably should, in each case, be indicated on a display on the data terminal device (cf. FIG. 4). It is possible in addition, for data terminal devices which are primarily used for voice transmission (telephony) (cf. FIG. 4), and with which a "Voice over IP" connection is not yet possible, to give priority to the connection to the circuit-switched network rather than the packet-switched network. This can be achieved, for example, by a time-controlled default setting. As such, if a change of operating mode has been made as described from the first operating mode to the second operating mode and if, after a session in the second operating mode ends, the data terminal device has not been reset within a prescribed time, a resetting to the original state (default state) will be effected automatically.

Embodiment (ii)

To describe this embodiment, it is now again assumed that the data terminal device DEE is in the first operating mode, for example, in which the data terminal device DEE is linked to the circuit-switched network LVN via the data transmission device DÜE. Of course, the other case in which the data terminal device DEE is in the second operating mode, also is possible.

Suppose the user of the data terminal device DEE now wishes to swap into the second operating mode, or the first operating mode, as applicable. The user of the data terminal device DEE initiates the operating mode change concerned by activating the control facility STM. For each change, the same key or softkey can, for example, always be used, or different keys also may be used for the two operating mode changes. In the case of voice control, on the other hand, the matter is unambiguous, because the spoken operating mode change always will be effected.

At this point, a fourth signal S4, to signal the change of operating mode, is transmitted from the data terminal device DEE via the first central control unit ZSE1 and the first terminal device/transmission device interface EÜSS1, under the control of the former, via the first line link LV1 or the first air link FRV1, as applicable, to the second terminal device/transmission device interface EÜSS2 in the data transmission device DÜE, via which the fourth signal S4 transmitted from the data terminal device DEE is forwarded either to the first switchover control facility USSM1 in the case of a change to the second operating mode (from which it follows that the current operating mode is the first operating mode), or in the case of a change to the first operating mode (from which it follows that the current operating mode is the second operating mode) via the first device/transmission device interface GÜSS1, the second line link LV2 or the second air link FRV2, as applicable, and the second device/transmission device interface GÜSS2, in that order, to the second switchover control facility USSM2 in the data processing device DVG.

On receiving the fourth signal S4, the first or second switchover control facility USSM1, USSM2, as applicable, will, in each case, then generate a fifth signal S5, with which the other switchover control facility concerned USSM2, USSM1 is informed of the change in operating mode concerned. The fifth signal S5 is transmitted via the first device/transmission device interface GÜSS1, the second line link LV2 or the second air link FRV2, as applicable, and the second device/transmission device interface GÜSS2, or in the opposite direction, to the relevant switchover control facility USSM2, USSM1. After the relevant switchover control facility USSM2, USSM1 has been informed of the change of operating mode, and with it the data processing device DVG or data transmission device DÜE, as applicable, the first or second switchover control facility USSM1, USSM2, as applicable, which received the fourth signal S4 then generates a sixth signal S6, in each case, and transmits this to the first switching facility USM1. If the change is to the second operating mode, the first switchover control facility USSM1 generates the sixth signal S6, while if the change is to the first operating mode, the second switchover control facility USSM1 generates the sixth signal S6. By the transmission of this sixth signal S6, the first switching facility USM1 is instructed to close the transmission path to the circuit-switched network LVN or to the packet-switched network, as applicable, which the data terminal device DEE has until now been using, and in its place to set up a new transmission path via the data processing device DVG to the packet-switched network PVN, or via the data transmission device DÜE to the circuit-switched network LVN, as appropriate. In FIG. 2, this operation is again indicated in the first switching facility USM1 by the switch symbol. The data terminal device DEE is thereby connected, as applicable, either to the packet-switched network PVN, via the second line link LV2 or the second air link FRV2, as applicable, and the data processing device DVG, or to the circuit-switched network LVN via the data transmission device DÜE. This transmission path, which belongs to the second operating mode or the first operating mode, as applicable, will now remain connected or set up, as applicable, until the user initiates another operating mode change in the same manner, this time a change from the second operating mode to the first operating mode, or from the first operating mode to the second operating mode, as applicable.

In order to inform the user about which operating mode the data terminal device is currently in, the operating mode which is active should again, in each case, preferably be indicated on a display on the data terminal device DEE (cf., FIG. 4). It is again possible, in addition, for data terminal devices which are primarily used for voice transmission (telephony) (cf., FIG. 4), and with which a "Voice over IP" connection is not yet possible, to give priority to the connection to the circuit-switched network rather than the packet-switched network. This can be achieved, for example, by a time-controlled default setting. As such, if a change of operating mode has been made as described, from the first operating mode to the second operating mode, or from the second operating mode to the first operating mode, as applicable, and if, after a session respectively in the second operating mode or first operating mode ends, the data terminal device has not been reset within a prescribed time, a resetting to the original state (default state) will be effected automatically.

Embodiment (iii)

To describe this embodiment, again it is now assumed that the data terminal device DEE is in the first operating mode, for example, in which the data terminal device DEE is linked to the circuit-switched network LVN via the data transmission device DÜE. Of course, the other case in which the data terminal device DEE is in the second operating mode, is again also possible.

Suppose the user of the data terminal device DEE now wishes to swap into the second operating mode, or the first operating mode, as applicable. The user of the data terminal device DEE initiates the operating mode change concerned by activating the control facility STM. For each change, the same key or softkey always can, for example, be used, or different keys also may be used for the two operating mode changes. In the case of voice control, on the other hand, the matter is unambiguous, because the spoken operating mode change will always be effected.

At this point, the fourth signal S4, to signal the change of operating mode, is again transmitted from the data terminal device DEE via the first central control unit ZSE1 and the first terminal device/transmission device interface EÜSS1, again under the control of the former, via the first line link LV1 or the first air link FRV1, as applicable, to the second terminal device/transmission device interface EÜSS2 in the data transmission device DÜE, via which the fourth signal S4 transmitted from the data terminal device DEE is forwarded either again to the first switchover control facility USSM1 in the case of a change to the second operating mode (from which it follows that the current operating mode is the first operating mode), or again in the case of a change to the first operating mode (from which it follows that the current operating mode is the second operating mode) via the first device/transmission device interface GÜSS1, the second line link LV2 or the second air link FRV2, as applicable, and the second device/transmission device interface GÜSS2, in that order, to the second switchover, control facility USSM2 in the data processing device DVG.

On receiving the fourth signal S4, the first switchover control facility USSM1 will then generate a seventh signal S7, with which it informs the second switchover control facility USSM2 of the change in operating mode which has been signaled to it. The seventh signal S7 is transmitted via the first device/transmission device interface GÜSS1, the second line link LV2 or the second air link FRV2, as applicable, and the second device/transmission device interface GÜSS2, to the second switchover control facility USSM2. After the switchover control facility USSM2 has been informed of the change of operating mode, and with it the data processing device DVG, the second switchover control facility USSM2 which has received the seventh signal S7 then generates an eighth signal S8 and transmits this via the second device/transmission device interface GÜSS2, the second line link LV2 or the second air link FRV2, as applicable, and the first device/transmission device interface GÜSS1, in that order, to the first switchover control facility USSM1. By this eighth signal S8, the second switchover control facility USSM2 signals to the first switchover control facility USSM1 that the latter should signal to the first switching facility USM1, and thus control, a change from the second operating mode to the first operating mode. The first switchover control facility USSM1 then generates a ninth signal S9, and transmits this to the first switching facility USM1. By the transmission of the ninth signal S9, the first switching facility USM1 is instructed to close the transmission path to the circuit-switched network LVN or to the packet-switched network PVN, as applicable, which the data terminal device DEE has, until now, been using, and in its place to set up a new transmission path via the data processing device DVG to the packet-switched network PVN, or via the data transmission device DÜE to the circuit-switched network LVN, as applicable. In FIG. 2, this operation is again indicated in the first switching facility USM1 by the switch symbol. The data terminal device DEE is thereby connected as applicable either to the packet-switched network PVN, via the second line link LV2 or the second air link FRV2, as applicable, and the data processing device DVG, or to the circuit-switched network LVN via the data transmission device DÜE. This transmission path, which belongs to the second operating mode or the first operating mode, as applicable, will now remain connected or set up, as applicable, until the user initiates another operating mode change, in the same manner, this time a change from the second operating mode to the first operating mode, or from the first operating mode to the second operating mode, as applicable.

In order to inform the user about which operating mode the data terminal device is currently in, the operating mode which is active should again, in each case, preferably be indicated on a display on the data terminal device DEE (cf., FIG. 4). It is again possible, in addition, for data terminal devices which are primarily used for voice transmission (telephony) (cf., FIG. 4), and with which a "Voice over IP" connection is not yet possible, to give priority to the connection to the circuit-switched network rather than the packet-switched network. This can be achieved, for example, by a time-controlled default setting. As such, if a change of operating mode has been made as described, from the first operating mode to the second operating mode, or from the second operating mode to the first operating mode, as applicable, and if, after a session respectively in the second operating mode or first operating mode ends, the data terminal device has not been reset within a prescribed time, a resetting to the original state (default state) will be effected automatically.

For the embodiments (i), (ii) and (iii) presented, it is an advantage if the operating mode change which is signaled using the signals S2, S5, S7, S8 is acknowledged by whichever switchover control facility receives these signals, using a tenth signal S10, before the operating mode change is carried out by the first switching facility USM1.

Figure 3:
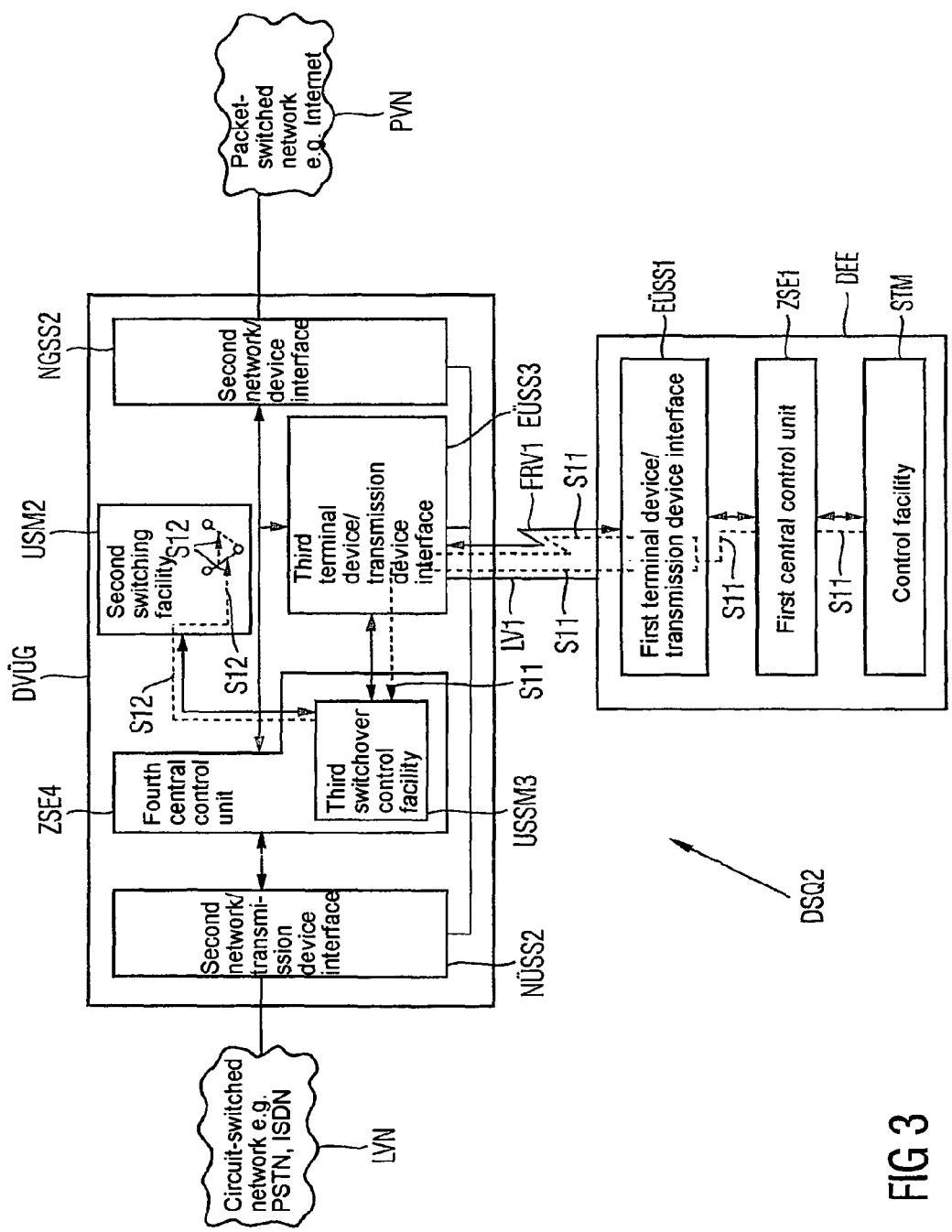
FIG. 3 based on FIG. 2, shows a second data sink/source for a circuit-switched and packet-switched network, consisting of a data terminal device and a data processing/data transmission device.

FIG. 3 shows a second data sink/source DSQ2 for a circuit-switched network LVN, preferably in the form of a "Public Switched Telephone Network (PSTN)" or an "Integrated Services Digital Network (ISDN)," and a packet-switched network PVN, preferably in the form of the Internet, including a data terminal device DEE and a data processing/data transmission device DVÜG. In the data processing/data transmission device DVÜG, the data processing device DVG shown in FIG. 2 and the data transmission device DUE shown in FIG. 2 are combined to form a single constructional and functional unit.

The data terminal device DEE contains the first central control unit ZSE1, the control facility STM and the first terminal device/transmission device interface EÜSS1. The first central control unit ZSE1 is used to control the functional flows in the data terminal device DEE, and is connected both to the control facility STM and to the first terminal device/transmission device interface EÜSS1. The data terminal device DEE is connected via the first terminal device/transmission device interface EÜSS1 to the data processing/data transmission device DVÜG, which has a third terminal device/transmission device interface EÜSS3 for this connection. Once again, either the first line link LV1 or the first air link FRV1 is provided as the link between the data terminal device DEE and the data processing/data transmission device DVÜG.

Apart from the third terminal device/transmission device interface EÜSS3, the data processing/data transmission device DVÜG also contains a fourth central control unit ZSE4, a second network/transmission device interface NÜSS2, a second switching facility USM2 and a second network/device interface NGSS2. The fourth central control unit ZSE4, which is used to control the functional flows in the data processing/data transmission device DVÜG and has a third switchover control facility USSM3, is connected to the third terminal device/transmission device interface EÜSS3, the second network/transmission device interface NÜSS2, and the second network/device interface NGSS2.

Together with the second switching facility USM2, the third switchover control facility USSM3 for the fourth central control unit ZSE4 forms one functional unit such that the switchover control facility USSM3 controls the switching facility USM1, which is represented in FIG. 3 by the link between the two facilities. The data processing/data transmission device DVÜG is connected, on the one hand, via the second network/transmission device interface NÜSS2 to the circuit-switched network LVN, and, on the other hand, via the second network/device interface NGSS2 to the packet-switched network PVN.

Below, using as a basis the explanation of the construction of the second data sink/source DSQ2, the way that the data sink/source DSQ2 functions is explained in respect of the elimination of the logical separation between those first applications, which are based on the circuit-switched network LVN, and those second applications, which are based on the packet-switched network PVN.

For the scenario shown in FIG. 3, it is now assumed that the data terminal device DEE is in the first operating mode; for example in which the data terminal device DEE is linked to the circuit-switched network LVN via the data processing/data transmission device DVÜG. Of course, the other case in which the data terminal device DEE is in the second operating mode, is also possible.

Suppose the user of the data terminal device DEE now wishes to swap into the second operating mode. The user of the data terminal device DEE initiates the operating mode change concerned by activating the control facility STM. At this point, an eleventh signal S11, to signal the change of operating mode, is transmitted from the data terminal device DEE via the first central control unit ZSE1 and the first terminal device/transmission device interface EÜSS1, under the control of the former, via the first line link LV1 or the first air link FRV1, as applicable, to the third terminal device/transmission device interface EÜSS3 in the data processing/data transmission device DVÜG, which forwards the eleventh signal S11 transmitted by the data terminal device DEE to the third switchover control facility USSM3.

The third switchover control facility USSM3 then generates a twelfth signal S12 and transmits this to the second switching facility USM2. By the transmission of the twelfth signal S12, the second switching facility USM2 is instructed to close the transmission path to the circuit-switched network LVN, which the data terminal device DEE until now has been using, and in its place to set up a new transmission path to the packet-switched network PVN. In FIG. 3, this operation is indicated in the second switching facility USM2 by the switch symbol. The data terminal device DEE is thereby connected to the packet-switched network PVN. This transmission path, which belongs to the second operating mode, will now remain connected or set up, as applicable, until the user initiates another operating mode change, in the same manner, this time a change from the second operating mode to the first operating mode.

In order to inform the user of the data terminal device about which operating mode the data terminal device is currently in, the operating mode which is active preferably should, in each case, be indicated on a display on the data terminal device (cf. FIG. 4). It is possible, in addition, for data terminal devices which are primarily used for voice transmission (telephony) (cf., FIG. 4), and with which a "Voice over IP" connection is not yet possible, to give priority to the connection to the circuit-switched network rather than the packet-switched network. This can be achieved, for example, by a time-controlled default setting. As such, if a change of operating mode has been made as described from the first operating mode to the second operating mode and if, after a session in the second operating mode ends, the data terminal device has not been reset within a prescribed time, a resetting to the original state (default state) will be effected automatically.

FIG. 4 shows the implementation of the first data sink/source DSQ1 in FIG. 2 in accordance with embodiment (i), using as the data terminal device and data transmission device a cordless telephone SLT, which is connected to the circuit-switched network LVN, together with a personal computer PC as the data processing device, this being connected to the packet-switched network. Apart from a screen (monitor) BSC, an input device EV consisting of a keyboard TA and a "mouse" MA, the personal computer PC has the devices as shown in FIG. 2 in a system unit SYE. Thus, in addition to the third central control unit ZSE3, the system unit SYE also contains the second device/transmission device interface GÜSS2, which takes the form of a USB interface (Universal Serial Bus), and the first network/device interface NSSG1 which takes the form of an Ethernet DSL interface (Digital Subscriber Line). The PC is connected to the cordless telephone SLT via a USB connection USBV, LV2 as the second line link. As its data transmission device, the cordless telephone SLT has a cordless base station SLB, and as the data terminal device a cordless mobile module SLM, these being connected to each other via an radio link FRV1 as the first air link. In addition to a display device (AE), the cordless mobile module SLM has an input unit EGE in the form of a keypad and an input facility EGM consisting of a microphone and an encapsulated speaker, the first central control unit ZSE1 and, as the first terminal device/transmission device interface, a first radio interface EÜSS1. The display unit AE, the input unit EGE and the input facility EGM form the control facility STM shown in FIG. 2. In the cordless base station SLB are located the second central control unit ZSE2 with the first switchover control facility USSM1, the first switching facility USM1, a second radio interface EÜSS2 as a second terminal device/transmission device interface, a line connection NÜSS1 as a first network/transmission device interface, and a further USB interface GÜSS1 as a first device/transmission device interface. The connection to the circuit-switched network LVN is established via the line connection NÜSS1, and the USB interface GÜSS1 is connected to the USB interface GÜSS2 in the personal computer PC via the USB link USBV, LV2.

If the cordless base station SLB is integrated into the personal computer PC as a cordless data adapter, then one obtains the second data sink/source DSQ2 as shown in FIG. 3.

Although the present invention has been described with reference to specific embodiments, those of skill in the art will recognize that changes may be made thereto without departing from the spirit and scope of the present invention as set forth in the hereafter appended claims.

What is claimed is:

1. A system for data transmission and data reception in a circuit-switched network and a packet-switched network, comprising:

a) a data processing and transmission device operable to be assigned to the packet-switched network via a packet-switched network interface and to be coupled with the circuit-switched network via a circuit-switched network interface and being universally operable to automatically process data as well as to send and receive data to or from the packet-switched network and to or from the circuit-switched network, b) a data terminal device assigned to said data processing and transmission device and operable to send and receive data to or from the circuit-switched network and to or from the packet-switched network via the data processing and transmission device, and c) wherein the data processing and transmission device includes:

a terminal device interface for communicating with the data terminal device, switching means operable to switch a data terminal device between (a) a first operating mode, in which the data terminal device is coupled with the circuit-switched network via the data processing and transmission device for sending and receiving data to and from one or more other data terminal devices via the circuit-switched network and (b) a second operating mode, in which the data terminal device is coupled with the packet-switched network via the data processing and transmission device for sending and receiving data to and from one or more other data terminal devices via the packet-switched network, and a first control unit operable to control functional flows in the data processing and transmission device, the first control unit comprising switchover control means coupled to the switching means, wherein the data terminal device comprises:
a user input interface configured to receive user input regarding switching between the first operating mode enabling the terminal device to send and receive data via the circuit-switched network and the second operating mode enabling the terminal device to send and receive data via the packet-switched network,
control means associated with the user input interface,
a second control unit operable to control functional flows in the data terminal device, and
a transmission unit configured to transmit the user-initiated switching information,
wherein the switchover control means and the switching means in the data processing and transmission device, together with the control means and second central control unit in the data terminal device, form a functional unit, wherein:
a) the control means in the data terminal device signal a change of operating mode to the switchover control means in the data processing and transmission device, and
b) the switchover control means in the data processing and transmission device control the switching means in the data processing and transmission device for the signaled change of operating mode,
such that the switching means is configured to switch the data terminal device between the first and second operating modes based on signals received from the control means in the data terminal device by closing a connection between the data terminal device and the circuit-switched network and setting up a connection between the data terminal device and the packet-switched network, or vice versa, offline and apart from any connection or communications with any other terminal device via the circuit-switched network or packet-switched network.

2. A system as claimed in claim 1, wherein the control means are one of:
a key on a keypad of the data terminal device,
a soft key of the data terminal device, and
a voice control implemented in the data terminal device.

3. A system as claimed in claim 1, wherein the data terminal device and the data processing and transmission device are connected via a first line link.

4. A system as claimed in claim 1, wherein the data terminal device and the data processing and transmission device are connected via a first air link.

5. A system as claimed in claim 1, wherein the data terminal device is integrated into the data processing and transmission device to form a unit.

6. A system as claimed in claim 1, wherein the data processing and transmission device is one of a set top box, a notebook and a personal computer.

7. A system as claimed in claim 1, wherein the switching means are formed as software modules embodied in computer readable media.

8. A system as claimed in claim 1, wherein the switchover control means are formed as software modules embodied in computer readable media.

9. A system as claimed in claim 4, wherein the data processing and transmission device is a data processing device with an integrated cordless data adapter.

10. A system as claimed in claim 4, wherein the data terminal device is a cordless mobile module.

11. A system as claimed in claim 1, wherein the data processing device is one of a personal computer, a notebook, a home server, and an office server.

12. A system as claimed in claim 1, wherein the data are at least one of voice data and packet data.

13. A data processing and transmission device for a circuit-switched network and a packet-switched network, the data processing and transmission device
a) being operable to be assigned to the packet-switched network via a packet-switched network interface and to be coupled with the circuit-switched network via a circuit-switched network interface and being universally operable to automatically process data as well as to send and receive data to or from the packet-switched network and to or from the circuit-switched network,
b) being operable to be assigned to a data terminal device operable to send and receive data to or from the circuit-switched network as well as to or from the packet-switched network via the data processing and transmission device via the terminal device interface,
c) comprising switching means operable to receive user-initiated switching information transmitted by a data terminal device and to switch the data terminal device between (a) a first operating mode, in which the data terminal device is coupled with the circuit-switched network via the data processing and transmission device for sending and receiving data to and from one or more other data terminal devices via the circuit-switched network and (b) a second operating mode, in which the data terminal device is coupled with the packet-switched network via the data processing and transmission device for sending and receiving data to and from one or more other data terminal devices via the packet-switched network,
comprising a first control unit operable to control functional flows in the data processing and transmission device, the first control unit comprising switchover control means coupled to the switching means,
wherein the switchover control means and the switching means in the data processing and transmission device form a functional unit with the data terminal device, wherein:
the switchover control means receives, from the data terminal device, user-initiated switching information signaling a change of operating mode,
the switchover control means controls the switching means in the data processing and transmission device for the signaled change of operating mode, and
the switching means is configured to switch the data terminal device between the first operating mode enabling the terminal device to send and receive data via the circuit-switched network and the second operating mode enabling the terminal device to send and receive data via the packet-switched network based on the user-initiated switching information received from the data terminal device by closing a connection between the data terminal device and the circuit-switched network and setting up a connection between the data terminal device and the packet-switched network, or vice versa, offline and apart from any connection or communications with any other terminal device via the circuit-switched network or packet-switched network.

14. A data processing and transmission device as claimed in claim 13, comprising a first line link through which the data processing and transmission device is connected to the data terminal device.

15. A data processing and transmission as claimed in claim 13, comprising a first air link through which the data processing and transmission device is connected to the data terminal device.

16. A data processing and transmission as claimed in claim 13, wherein the data terminal device is integrated into the data processing and transmission device to form a single constructional and functional unit.

17. A data processing and transmission device as claimed in claim 13, wherein the data processing and transmission device is one of a set top box, a notebook and a personal computer.

18. A data processing and transmission device as claimed in claim 13, comprising third switchover control means which, together with the switching means and control means and a first central control unit in the data terminal device form a functional unit, wherein
   a) the control means signal a change of operating mode to the third switchover control means; and
   b) the third switchover control means control the switching means for the signaled change of operating mode.

19. A data processing and transmission device as claimed in claim 13, wherein the switching means are formed as software modules embodied in computer readable media.

20. A data processing and transmission device as claimed in claim 13, wherein the switchover control means are formed as software modules embodied in computer readable media.

21. A data processing and transmission ion device as claimed in claim 18, wherein the third switchover control means is contained in a fourth central control unit for controlling the functional flow.

22. A data processing and transmission device as claimed in claim 15, wherein the data processing and transmission device comprises an integrated cordless data adapter.

23. A data processing and transmission device as claimed in claim 13, wherein the data are at least one of voice data and packet data.

24. A data terminal device for a circuit-switched network and a packet-switched network, the data terminal device:
   being operable to be assigned to a data processing and transmission device via a terminal device interface for communicating with the data terminal device, wherein the data processing and transmission device is operable to be coupled with the circuit-switched network via a circuit-switched network interface and to be assigned to the packet-switched network via a packet-switched network interface and universally operable to automatically process data as well as to send and receive data to or from the circuit-switched network and to or from the packet-switched network via the data processing and transmission device, and
   comprising:
      control means and a first central control unit controlling the functional flow in the data terminal device, the control means comprising a user input interface configured to receive user input regarding switching between a first operating mode for circuit-switched communications and a second operating mode for packet-switched communications, and
      a transmission unit configured to transmit user-initiated switching information based on the received user input,
      wherein the control means, first central control unit, and transmission unit of the data terminal device are coupled to each other and form a functional unit with switchover control means and switching means in the data processing and transmission device, such that the control means in the data terminal device is operable to signal, based on the user-initiated switching information received via the user input interface a change of operating mode to the switchover control means in the data processing and transmission device, which switchover control means is operable to control the switching means in the data processing and transmission device based on the signaled change of operating mode to switch the data terminal device between (a) the first operating mode, in which the data terminal device is coupled with the circuit-switched network via the data processing and transmission device, thereby enabling the data terminal to send and receive data to and from one or more other data terminal devices via the circuit-switched network and (b) the second operating mode, in which the data terminal device is coupled with the packet-switched network via the data processing and transmission device, thereby enabling the data terminal to send and receive data to and from one or more other data terminal devices via the packet-switched network,
      the data terminal device being switched between the first and second operating modes by closing a connection between the data terminal device and the circuit-switched network and setting up a connection between the data terminal device and the packet-switched network, or vice versa, offline and apart from any connection or communications with any other terminal device via the circuit-switched network or packet-switched network.

25. A data terminal device as claimed in claim 24, wherein the control means are one of a key on a keypad of the data terminal device, a soft key of the data terminal device, and a voice control implemented in the data terminal device.

26. A data terminal device as claimed in claim 24, comprising a first line link through which the data terminal device is connected to the data processing and transmission device.

27. A data terminal device as claimed in claim 24, comprising a first air link through which the data terminal device is connected to the data processing and transmission device.

28. A data terminal device as claimed in claim 24, wherein the data terminal device is integrated into the data processing and transmission device to form one constructional unit.

29. A data terminal device as claimed in claim 24, wherein the data terminal device is a cordless mobile module.

30. A data terminal device as claimed in claim 24, wherein the data are at least one of voice data and packet data.

31. A system for data transmission and data reception in a circuit-switched network and a packet-switched network, comprising:
   a data processing and transmission device operable to be assigned to the packet-switched network via a packet-switched network interface and to be coupled with the circuit-switched network via a circuit-switched network interface and being universally operable to automatically process data as well as to send and receive data to or from the packet-switched network and to or from the circuit-switched network,
   wherein the data processing and transmission device comprises (a) switching means and (b) a first control unit operable to control functional flows in the data processing and transmission device, the first control unit comprising switchover control means,
   a data terminal device assigned to said data processing and transmission device and operable to send and receive data to or from the circuit-switched network and to or from the packet-switched network via the data processing and transmission device, wherein the data terminal device comprises control means and a first central control unit coupled to the control means, wherein the central control unit is operable to control functional flows in the data terminal device, and wherein the control means are configured to signal a change of operating mode to the switchover control means in the data processing and transmission device, wherein the switchover control means in the data processing and transmission device are configured to (a) receive the signaled change of operating mode from the data terminal device and (b) accordingly control the switching means in the data processing and transmission device based on the signaled change of operating mode to switch the data terminal device between (a) a first operating mode, in which the data terminal device is coupled with the circuit-switched network via the data processing and transmission device, thereby enabling the data terminal to send and receive data to and from one or more other data terminal devices via the circuit-switched network and (b) a second operating mode, in which the data terminal device is coupled with the packet-switched network via the data processing and transmission device, thereby enabling the data terminal to send and receive data to and from one or more other data terminal devices via the packet-switched network, wherein the switchover control means and the switching means in the data processing and transmission device, together with the control means and central control unit in the data terminal device, form a functional unit for switching the data terminal device between the first and second operating modes, wherein the switching means in the data processing and transmission device is configured to switch the data terminal device between the first and second operating modes by closing a connection between the data terminal device and the circuit-switched network and setting up a connection between the data terminal device and the packet-switched network, or vice versa, offline and apart from any connection or communications with any other terminal device via the circuit-switched network or packet-switched network, and wherein the data terminal device is a handheld phone configured to support both circuit-switched and packet-switched communications for a user of the data terminal device.

32. A data processing and transmission device for a circuit-switched network and a packet-switched network, the data processing and transmission device:
a) being operable to be assigned to the packet-switched network via a packet-switched network interface and to be coupled with the circuit-switched network via a circuit-switched network interface and being universally operable to automatically process data as well as to send and receive data to or from the packet-switched network and to or from the circuit-switched network,
b) being operable to be assigned to a data terminal device operable to send and receive data to or from the circuit-switched network as well as to or from the packet-switched network via the data processing and transmission device via a terminal device interface, and
c) comprising switching means and a first control unit operable to control functional flows in the data processing and transmission device, the first control unit comprising switchover control means coupled to the switching means, wherein the switching means and switchover control means of the data processing and transmission device, together with control means of the data terminal device and a central control unit operable to control functional flows in the data terminal device, form a functional unit, wherein the switchover control means are configured to receive a signaled change of operating mode from the control means in the data terminal device, and accordingly control the switching means the data processing and transmission device based on the signaled change of operating mode to switch the data terminal device between (a) a first operating mode, in which the data terminal device is coupled with the circuit-switched network via the data processing and transmission device, thereby enabling the data terminal to send and receive data to and from one or more other data terminal devices via the circuit-switched network and (b) a second operating mode, in which the data terminal device is coupled with the packet-switched network via the data processing and transmission device, thereby enabling the data terminal to send and receive data to and from one or more other data terminal devices via the packet-switched network, wherein the switching means is configured to switch the data terminal device between the first and second operating modes by closing a connection between the data terminal device and the circuit-switched network and setting up a connection between the data terminal device and the packet-switched network, or vice versa, offline and apart from any connection or communications with any other terminal device via the circuit-switched network or packet-switched network, wherein the data terminal device is a handheld phone configured to support both circuit-switched and packet-switched communications for a user of the data terminal device.

33. A data terminal device for a circuit-switched network and a packet-switched network, the data terminal device:
being operable to be assigned to a data processing and transmission device via a terminal device interface for communicating with the data terminal device, wherein the data processing and transmission device is operable to be coupled with the circuit-switched network via a circuit-switched network interface and to be assigned to the packet-switched network via a packet-switched network interface and universally operable to automatically process data as well as to send and receive data to or from the circuit-switched network and to or from the packet-switched network via the data processing and transmission device, and
comprising:
control means and a first central control unit controlling the functional flow in the data terminal device,
wherein the control means and the first central control unit are coupled together and form a functional unit with switchover control means and switching means in the data processing and transmission device,
wherein the control means and the first central control unit are operable to signal a change of operating mode to the switchover control means in the data processing and transmission device, which switchover control means is operable to control the switching means in the data processing and transmission device based on the signaled change of operating mode to switch the data terminal device between (a) a first operating mode, in which the data terminal device is coupled with the circuit-switched network via the data processing and transmission device, thereby enabling the data terminal to send and receive data to and from one or more other data terminal devices via the circuit-switched network and (b) a second operating mode, in which the data terminal device is coupled with the packet-switched network via the data processing and transmission device, thereby enabling the data terminal to send and receive data to and from one or more other data terminal devices via the packet-switched network, the data terminal device being switched between the first and second operating modes by closing a connection between the data terminal device and the circuit-switched network and setting up a connection between the data terminal device and the packet-switched network, or vice versa, offline and apart from any connection or communications with any other terminal device via the circuit-switched network or packet-switched network, wherein the data terminal device is a handheld phone configured to support both circuit-switched and packet-switched communications for a user of the data terminal device.

* * * * *